A. J. THREM.
LOCK NUT.
APPLICATION FILED JULY 13, 1910.
1,024,427.
Patented Apr. 23, 1912.
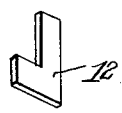
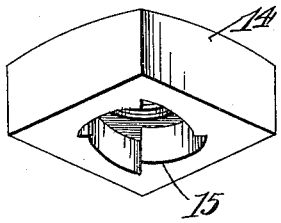
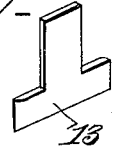
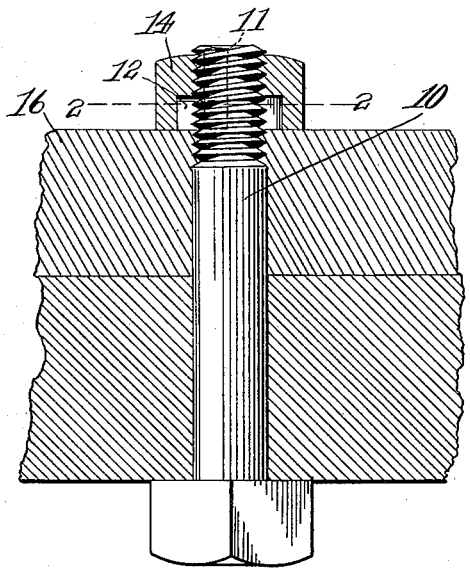
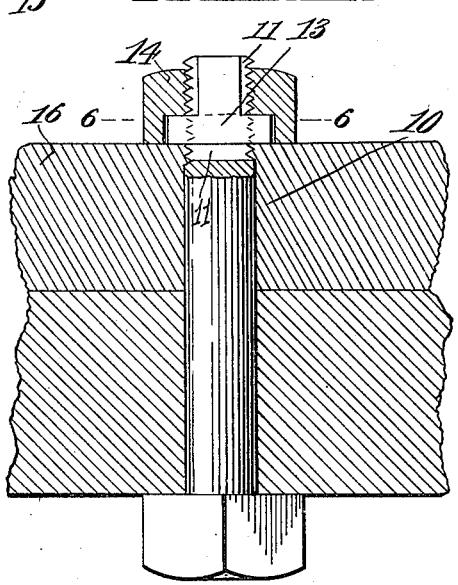
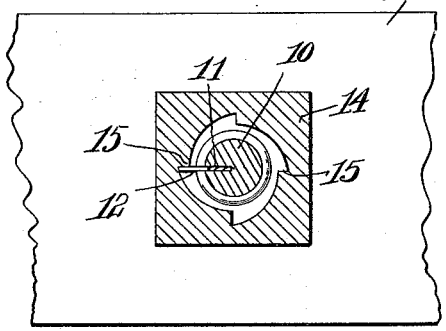
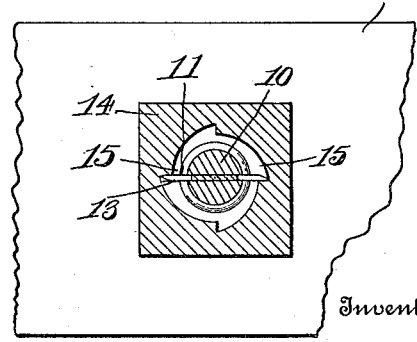
Witnesses
F. H. Taylor.
C. H. Woodward.
Inventor
Albert J. Threm.
By Chandler & Chandler
Attorneys

UNITED STATES PATENT OFFICE.

ALBERT J. THREM, OF BEANS CREEK, TENNESSEE.

LOCK-NUT.

1,024,427.  Specification of Letters Patent.  Patented Apr. 23, 1912.

Application filed July 13, 1910. Serial No. 571,803.

*To all whom it may concern:*

Be it known that I, ALBERT J. THREM, a citizen of the United States, residing at Beans Creek, in the county of Franklin, State of Tennessee, have invented certain new and useful Improvements in Lock-Nuts; and I do hereby declare the following to be a full, clear, and exact description of the invention, such as will enable others skilled in the art to which it appertains to make and use the same.

This invention relates to improvements in lock nuts, and has for one of its objects to improve the construction and increase the efficiency and utility of devices of this character.

With this and other objects in view, the invention consists in certain novel features of construction as hereinafter shown and described and then specifically pointed out in the claim; and, in the drawings illustrative of the preferred embodiment of the invention, Figure 1 is a side elevation of a bolt with the improvement applied, the nut and the structure through which the bolt operates being in section, Fig. 2 is a plan view with the bolt and nut in section on the line 2—2 of Fig. 1, Fig. 3 is an enlarged perspective view from beneath of the improved nut, detached, Fig. 4 is a perspective view of the locking pin, detached, Fig. 5 is a view similar to Fig. 1, illustrating a modification in the construction, Fig. 6 is a plan view with the nut and bolt in section on the line 6—6 of Fig. 5, Fig. 7 is a perspective view of the form of locking pin employed in connection with the modified structures shown in Figs. 5 and 6.

The improved device may be applied to bolts of various sizes and to bolts employed for various purposes, and in the improved construction the bolt 10 is provided with a slot 11 extending longitudinally of the threads, and the slot may be formed partly through the bolt as shown in Figs. 1 and 2, or entirely through the bolt, as shown in Figs. 5 and 6. When the slot is formed partly through the bolt only, as shown in Figs. 1 and 2, an L-shaped locking pin or plate 12 is employed of the form shown in Figs. 1, 2 and 4, one arm of the plate extending longitudinally of the bolt within the slot 11, while the other arm projects laterally beyond the bolt, as shown in Figs. 1 and 2, and when the slot is formed entirely through the bolt as shown in Figs. 5 and 6, a T-shaped plate 13 is employed as shown more particularly in Fig. 7, with its stock located within the recess 11 and with the terminals of its head portion extending from the slot at opposite sides, as shown in Figs. 5 and 6.

The nut employed in the improved device is of the usual form as shown at 14, and is provided with a recess in its lower face formed with a plurality of ratchet-shaped projections 15. The projecting portions of the plates 12—13 are of sufficient length to extend to the outer portions of the recess of the nut and bear against the abutments formed by the ratchet-shaped portions 15, as shown in Figs. 2 and 6. When the L-shaped plate 12 is employed as shown in Figs. 1 and 2, only one projecting portion will be presented and engage against one of the abutments 15, but when the plate 13 is employed as shown in Figs. 5 and 6 two projecting portions will be presented and engage two of the abutments. The plates 12—13 will be constructed of resilient metal, preferably light steel, so that they will bend under pressure when the nut is rotated.

When the improved device is to be applied the bolt 10 is inserted through the structure to which it is applied and represented at 16, and the locking plate 12 or 13, as the case may be, inserted in the recess in the bolt and the nut 14 turned "home" by a wrench or other implement, and as the nut moves over the resilient plate 12 or 13 the projecting portions of the plate will be bent sidewise by the inclined sides of the abutments 15 and permit the nut to be turned over the plate, and as the nut is rotated the projecting portions of the locking plates snap into position behind the abutments, and thus effectually prevent the nut from retrograde movement. By this arrangement it will be obvious that the nut may be turned home when a sufficient force is applied to overcome the resistance of the plates 12 or 13, but will be effectually prevented from retrograde movement by the resistance of the plates. The plates 12 or 13 will thus be sufficient to effectually prevent any retrograde movement of the nut under any normal strains to which it will be employed. If the nut is to be detached an abnormal strain applied to the nut will cause the fracture of the relatively thin plates and permit the nut to be removed, and if the nut is to be returned to the bolt new plates 12 or 13, as the case may be, will be supplied, but the expense of new plates is practically negligible.

The improved device is simple in construction, can be inexpensively manufactured and applied and operates effectually for the purposes described.

What is claimed is:—

The combination with a bolt having a longitudinal recess in its threaded portion, of a T-shaped plate of resilient metal having its head seated in the recess of the bolt with the terminals thereof extending beyond the same at opposite sides, and a nut having a recess in one face provided with inwardly directed abutments in the walls of the recess, said nut being engaged upon the bolt and said abutments engaged by the locking plate.

In testimony whereof, I affix my signature, in presence of two witnesses.

ALBERT J. THREM.

Witnesses:
 Joe. A. Willis,
 Joseph E. Stewart.

---

Copies of this patent may be obtained for five cents each, by addressing the "Commissioner of Patents, Washington, D. C."